United States Patent
K et al.

(10) Patent No.: US 12,066,974 B2
(45) Date of Patent: Aug. 20, 2024

(54) SYSTEMS AND METHODS FOR END-TO-END WORKLOAD MODELING FOR SERVERS

(71) Applicant: Dell Products L.P., Round Rock, TX (US)

(72) Inventors: Venkatesan K, Kottucherry (IN); Latchumi K, Chennai (IN); Suren Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 17/573,837

(22) Filed: Jan. 12, 2022

(65) Prior Publication Data

US 2023/0222087 A1 Jul. 13, 2023

(51) Int. Cl.
*G06F 15/17* (2006.01)
*G06F 9/50* (2006.01)
*G06F 15/177* (2006.01)

(52) U.S. Cl.
CPC .......... *G06F 15/177* (2013.01); *G06F 9/5044* (2013.01)

(58) Field of Classification Search
CPC .............................. G06F 15/177; G06F 9/5044
See application file for complete search history.

(56) References Cited

U.S. PATENT DOCUMENTS

| | | | |
|---|---|---|---|
| 6,944,759 B1* | 9/2005 | Crisan | G06F 8/65 |
| | | | 702/182 |
| 7,536,449 B2* | 5/2009 | Melo | H04L 41/0889 |
| | | | 709/224 |
| 10,114,431 B2* | 10/2018 | Garden | G06F 9/5094 |
| 2005/0198235 A1* | 9/2005 | Kumar | H04L 12/00 |
| | | | 709/222 |
| 2008/0250405 A1* | 10/2008 | Farhangi | G06F 8/61 |
| | | | 717/177 |
| 2011/0078297 A1* | 3/2011 | Tamura | G06F 9/4843 |
| | | | 709/223 |
| 2017/0171021 A1* | 6/2017 | Angaluri | G06F 8/63 |
| 2020/0084099 A1* | 3/2020 | Russell | H04L 41/0879 |
| 2020/0133735 A1* | 4/2020 | Zhao | G06F 9/4881 |
| 2020/0322425 A1* | 10/2020 | Sharma | G06F 9/5061 |
| 2021/0019131 A1* | 1/2021 | Tulsian | H04L 41/24 |
| 2021/0089341 A1* | 3/2021 | Medina | G06F 9/45558 |
| 2022/0156162 A1* | 5/2022 | Reyes | G06F 11/3006 |
| 2023/0229414 A1* | 7/2023 | Gore | G06F 8/65 |
| | | | 717/171 |

\* cited by examiner

*Primary Examiner* — Zahid Choudhury
(74) *Attorney, Agent, or Firm* — Jackson Walker L.L.P.

(57) ABSTRACT

An information handling system may include a processor and non-transitory computer-readable media communicatively coupled to the processor and having stored thereon a program of instructions configured to, when read and executed by the processor, perform data collection to retrieve hardware information regarding a second information handling system and analyze the hardware information to determine one or more recommended purposes for the second information handling system.

9 Claims, 2 Drawing Sheets

SYSTEMS AND METHODS FOR END-TO-END WORKLOAD MODELING FOR SERVERS

TECHNICAL FIELD

The present disclosure relates in general to information handling systems, and more particularly to methods and systems for performing end-to-end workload modeling for information handling system servers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To configure a server based on hardware availability, basic input/output system (BIOS) capabilities, and supported technologies, a user (e.g., an administrator or information technology technician) may require product and hardware knowledge for defining the purpose of the server in order to maximize server performance. Further, to configure the server, various tools and interfaces may be available, with each interface having its own limitation which may operate at specific use cases, creating challenges for the user to identify and use appropriate tools and interfaces for a server requirement. Further, many interfaces and tools may include extensive documentation (e.g., user guides and "readme" files) describing proper configuration of the server. Accordingly, server configuration is often prone to user error in configuration and may lead to inefficient use of server resources.

SUMMARY

In accordance with the teachings of the present disclosure, the disadvantages and problems associated with server configuration may be reduced or eliminated.

In accordance with embodiments of the present disclosure, an information handling system may include a processor and non-transitory computer-readable media communicatively coupled to the processor and having stored thereon a program of instructions configured to, when read and executed by the processor, perform data collection to retrieve hardware information regarding a second information handling system and analyze the hardware information to determine one or more recommended purposes for the second information handling system.

In accordance with these and other embodiments of the present disclosure, a method may include performing data collection to retrieve hardware information regarding an information handling system and analyzing the hardware information to determine one or more recommended purposes for the information handling system.

In accordance with these and other embodiments of the present disclosure, an article of manufacture may include a processor, a non-transitory computer-readable medium, and computer-executable instructions carried on the computer-readable medium, the instructions readable by the processor, the instructions, when read and executed, for causing the processor to perform data collection to retrieve hardware information regarding an information handling system and analyze the hardware information to determine one or more recommended purposes for the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
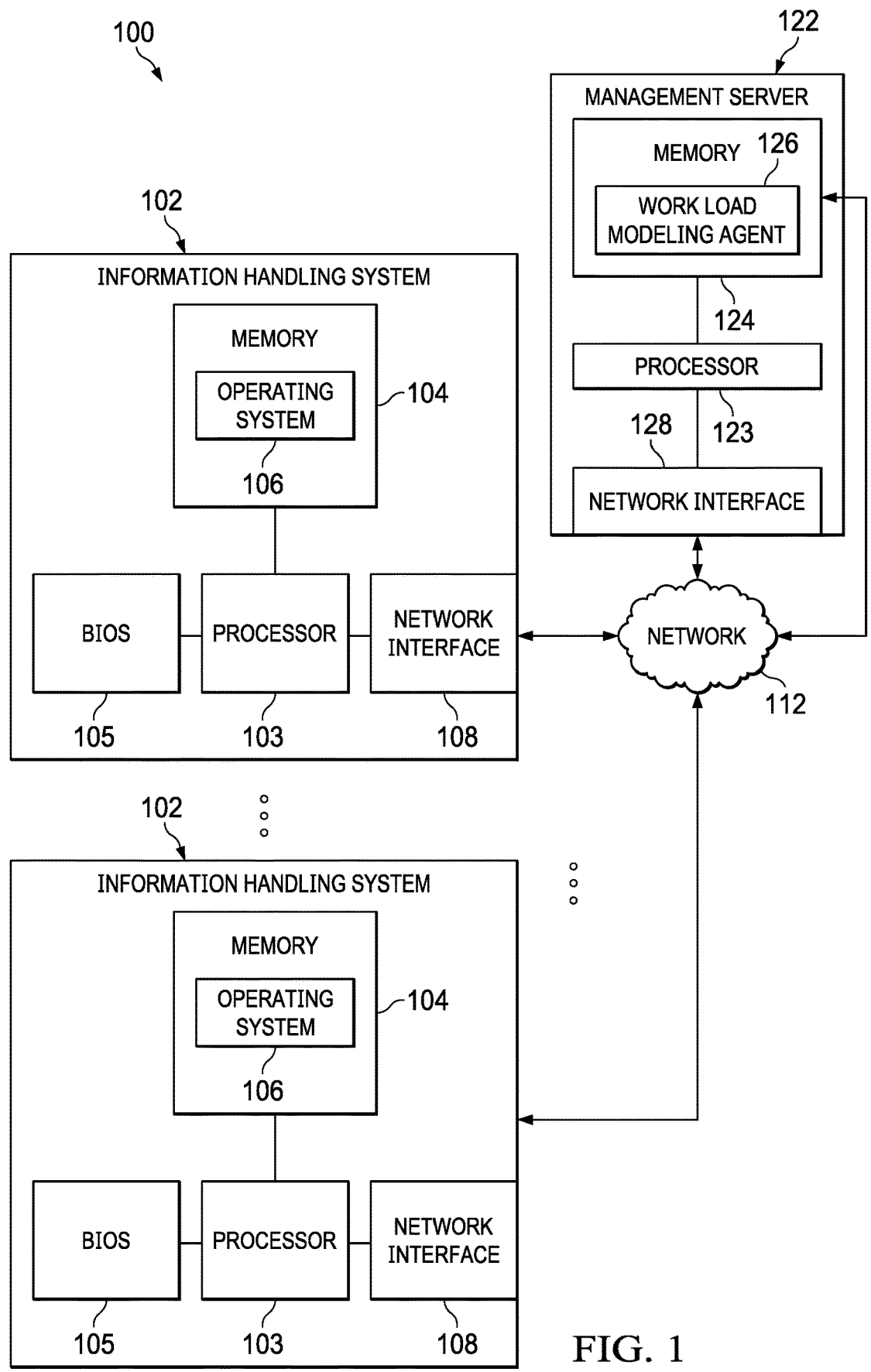
FIG. 1 illustrates a block diagram of an example system for end-to-end workload modeling for one or more servers, in accordance with embodiments of the present disclosure.
Figure 2:
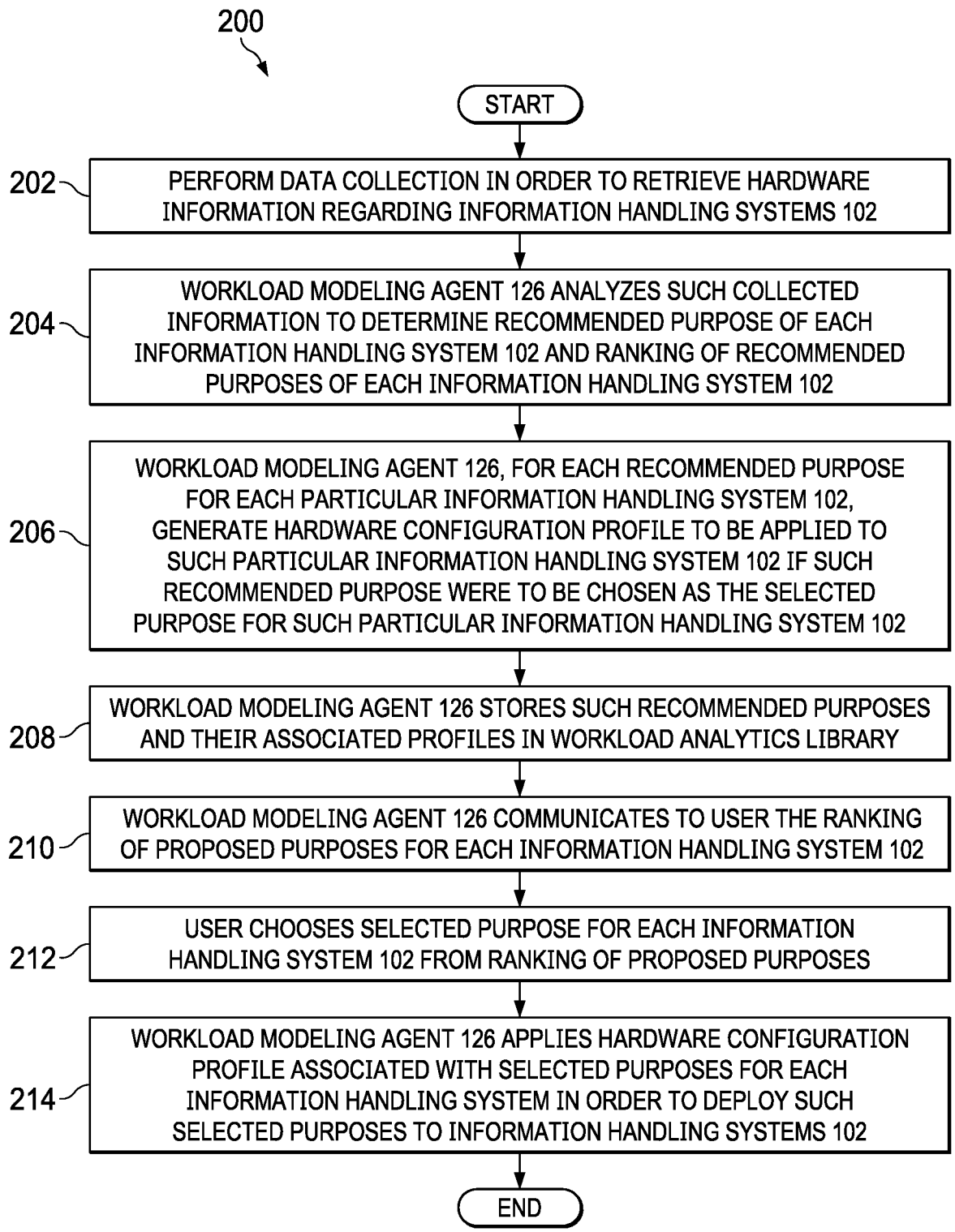
FIG. 2 illustrates a flowchart of an example method for end-to-end workload modeling for one or more servers, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for end-to-end workload modeling for one or more information handling systems 102, in accordance with embodiments of the present disclosure. As shown in FIG. 1, system 100 may include one or more information handling systems 102, network 112, and management server 122.

In some embodiments, an information handling system 102 may comprise a personal computer. In some embodiments, an information handling system 102 may comprise or be an integral part of a server. In other embodiments, an information handling system 102 may comprise a portable information handling system (e.g., a laptop or notebook, etc.). As depicted in FIG. 1, an information handling system 102 may include a processor 103, a memory 104 communicatively coupled to processor 103, a BIOS 105 communicatively coupled to processor 103, and a network interface 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. Network interface 108 may be configured to communicate via wire-line transmissions, wireless transmission, or both.

In addition to processor 103, memory 104, BIOS 105, and network interface 108, information handling system 102 may include one or more other information handling resources.

Network 112 may be a network and/or fabric configured to couple information handling system 102, management server 122, and/or one or more other information handling systems to one another. In these and other embodiments, network 112 may include a communication infrastructure, which provides physical connections, and a management layer, which organizes the physical connections and information handling systems communicatively coupled to network 112. Network 112 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 112 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 112 and its various components may be implemented using hardware, software, or any combination thereof.

Management server 122 may comprise any information handling system including requisite hardware, software, and/or firmware for interfacing information handling system 102 via network 112 in order to perform end-to-end workload modeling, as described in greater detail below.

As depicted in FIG. 1, management server 122 may include a processor 123, a memory 124 communicatively coupled to processor 123, and a network interface 128 communicatively coupled to processor 123.

Processor 123 may include any system, device, or apparatus configured to interpret and/or execute program instructions and/or process data, and may include, without limitation a microprocessor, microcontroller, DSP, ASIC, or any other digital or analog circuitry configured to interpret and/or execute program instructions and/or process data. In some embodiments, processor 123 may interpret and/or execute program instructions and/or process data stored in memory 124 and/or another component of management server 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to management server 122 is turned off.

As shown in FIG. 1, memory 124 may have a workload modeling agent 126 stored thereon. Workload modeling agent 126 may comprise any suitable program of instructions configured to, when loaded by processor 123 from memory 124, perform end-to-end workload modeling of information handling systems 102, as set forth in greater detail below.

Network interface 128 may comprise any suitable system, apparatus, or device operable to serve as an interface between management server 122 and network 112. Network interface 128 may enable management server 122 to communicate using any suitable transmission protocol and/or standard, including any of the protocols and/or standards described above with respect to network 112. In these and other embodiments, network interface 128 may comprise a NIC.

In addition to information handling system 102, network 112, and management server 122, system 100 may include one or more other information handling resources.

In operation, workload modeling agent 126 may, via network interface 128 and network 112, perform data collection in order to retrieve hardware information (e.g., information regarding processors, memory, storage, network interfaces, peripheral devices, cryptographic processors, graphics processors, and BIOS capabilities) from information handling systems 102. After collecting such hardware information, workload modeling agent 126 may analyze such information to determine a recommended purpose of each information handling system 102, and may also determine a ranking of recommended purposes of each information handling system. Workload modeling agent 126 may further communicate such determined recommended purpose and determined ranking to a user (e.g., administrator or information technology technician) to allow a user to choose the purpose of each information handling system 102, which may thus define the type of processing workload each information handling system 102 will handle. Workload modeling agent 126 may also, for each ranked recommended purpose, generate a recommended configuration profile associated with such ranked recommended purpose, which may be based on vendor recommendations for each information handling system 102 or its components. Accordingly, the user may be enabled to, based on hardware configurations of each information handling system 102, select a purpose for each such information handling system 102 and apply configuration settings for each information handling system 102 related to its selected purpose. Such configurations may then be applied to one or more information handling systems 102 via any suitable device management console.

FIG. 2 illustrates a flowchart of an example method 200 for end-to-end workload modeling for one or more servers, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, workload modeling agent 126 may perform data collection in order to retrieve hardware information regarding information handling systems 102. Such information may include, without limitation, information regarding processors, memory, storage, network interfaces, peripheral devices, cryptographic processors, graphics processors, and BIOS capabilities of each information handling system.

At step 204, workload modeling agent 126 may analyze such information to determine a recommended purpose of each information handling system 102, and may also determine a ranking of recommended purposes of each information handling system 102. For example, workload modeling agent 126 may execute a workload analytics engine in which all server configuration data (e.g., memory matrix, processor matrix, peripheral slot priority matrix, platform product specification, BIOS feature guide, configuration matrix, thermal restriction requirements, platform restrictions requirements, cable plans, etc.) may be coded as preset data to a server database pool and provided as input to such workload analytics engine. Based on such server configuration data and collected data from information handling systems 102, workload modeling agent 126 may propose one or more recommended purposes for each information handling system 102 and rank such one or more recommended purposes for each information handling system 102

(e.g., most recommended purpose assigned a rank of 1, second-most recommended purpose assigned a rank of 2, and so on).

At step 206, workload modeling agent 126 may, for each recommend purpose for a particular information handling system 102, generate a hardware configuration profile to be applied to such particular information handling system 102 if such recommended purpose were to be chosen as the selected purpose for such particular information handling system 102. In some embodiments, workload modeling agent 126 may also, for each such hardware configuration profile, include recommendations for hardware modifications that may further optimize the proposed purpose. For example, if workload modeling agent 126 determines, based on a memory slot priority matrix, that not all memory modules are spread across memory channels equally for a particular information handling system 102 to perform a particular purpose, workload modeling agent 126 may include within the hardware configuration profile a suggestion to populate all memory channels equally.

At step 208, workload modeling agent 126 may store such recommended purposes and their associated profiles in a suitable database, which may be referred to as a workload analytics library. Accordingly, if a user chooses a particular purpose (and/or changes selection of the purpose) for a particular information handling system 102, the hardware configuration profile for such selected purpose may readily be available for application to the particular information handling system 102.

At step 210, workload modeling agent 126 may communicate to the user (e.g., via a graphical user interface) the ranking of proposed purposes for each information handling system 102. At step 212, the user may choose a selected purpose from the ranking of proposed purposes. At step 214, workload modeling agent 126 may apply the hardware configuration profile (e.g., generated by workload modeling agent 126 and stored in the workload analytics library) in order to deploy such selected purpose to a particular information handling system 102.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A management server comprising:
a processor; and
non-transitory computer-readable media communicatively coupled to the processor and having stored thereon a program of instructions, that when executed by the processor, cause the management server to perform workload modeling operations including:
performing data collection to retrieve hardware information regarding each of a plurality of managed information handling systems;
analyzing the hardware information to determine one or more recommended purposes for each of the plurality of managed information handling systems;
determining a ranking of the one or more recommended purposes;
communicating to a user the ranking of the one or more recommended purposes; and in response to a user selection of a selected purpose from the one or more recommended purposes, applying the hardware configuration profile associated with the selected purpose to the particular managed information handling system.

2. The information handling system of claim 1, wherein the workload modeling operations further include, for each particular recommended purpose:
generating a hardware configuration profile to be applied to each particular managed information handling system if the particular recommended purpose were to be chosen as the selected purpose of the particular managed information handling system; and
storing the hardware configuration profiles to a library.

3. The information handling system of claim 2, wherein each hardware configuration profiles includes recommendations for hardware modifications of the particular managed information handling system to optimize the particular recommended purpose.

4. A method comprising:
performing data collection to retrieve hardware information regarding each of a plurality of managed information handling systems;
analyzing the hardware information to determine one or more recommended purposes for each of the plurality of managed information handling systems;
determining a ranking of the one or more recommended purposes;
communicating to a user the ranking of the one or more recommended purposes; and
in response to a user selection of a selected purpose from the one or more recommended purposes, applying the hardware configuration profile associated with the selected purpose to the particular managed information handling system.

5. The method of claim 4, further comprising, for each particular recommended purpose:
generating a hardware configuration profile to be applied to each particular managed information handling system if the particular recommended purpose were to be chosen as the selected purpose of the particular managed information handling system; and
storing the hardware configuration profiles to a library.

6. The method of claim 5, wherein each hardware configuration profiles includes recommendations for hardware modifications of the particular managed information handling system to optimize the particular recommended purpose.

7. An article of manufacture comprising:
a processor;
a non-transitory computer-readable medium; and
computer-executable instructions carried on the computer-readable medium, the instructions readable by the processor, the instructions, when read and executed, for causing the processor to perform workload modeling operations including:
performing data collection to retrieve hardware information regarding each of a plurality of managed information handling systems; and
analyzing the hardware information to determine one or more recommended purposes for each of the plurality of managed information handling systems;
determining a ranking of the one or more recommended purposes;
communicating to a user the ranking of the one or more recommended purposes; and
in response to a user selection of a selected purpose from the one or more recommended purposes, applying the hardware configuration profile associated with the selected purpose to the particular managed information handling system.

8. The article of claim 7, workload modeling operations further including, for each particular recommended purpose:
generating a hardware configuration profile to be applied to each particular managed information handling system if the particular recommended purpose were to be chosen as the selected purpose of the particular managed information handling system; and
storing the hardware configuration profiles to a library.

9. The article of claim 8, wherein one or more of the hardware configuration profiles includes recommendations for hardware modifications of the particular managed information handling system to optimize the particular recommended purpose.

* * * * *